United States Patent
Larguier

[19]

[11] Patent Number: 6,040,634
[45] Date of Patent: Mar. 21, 2000

[54] ELECTRIC MOTOR/THERMAL ENGINE DRIVE FOR A VEHICLE IN WHICH THE ELECTRIC MOTOR FUNCTIONS AS A FLYWHEEL, STARTER MOTOR, AND GENERATOR

[76] Inventor: René Larguier, 39 Boulevard d'Argenson, F-92200 Neuilly-sur-Seine, France

[21] Appl. No.: 08/692,099

[22] Filed: Aug. 5, 1996

Related U.S. Application Data

[62] Continuation-in-part of application No. 08/651,852, Jan. 30, 1996, which is a continuation of application No. 08/252,252, which is a continuation of application No. 07/861,787, filed as application No. PCT/FR90/00916, Dec. 17, 1990, abandoned.

[30] Foreign Application Priority Data

Dec. 19, 1989 [LU] Luxembourg .............................. 87644

[51] Int. Cl.⁷ .................................................. B60L 11/02
[52] U.S. Cl. ................................ 290/45; 290/46; 290/47; 290/48; 290/49
[58] Field of Search ...................... 290/45, 48; 180/65.1, 180/65.2, 65.3, 65.4

[56] References Cited

U.S. PATENT DOCUMENTS

| | | | |
|---|---|---|---|
| 3,791,473 | 2/1974 | Rosen | 180/65.2 |
| 3,888,325 | 6/1975 | Reinbeck | 180/65.2 |
| 3,904,883 | 9/1975 | Horwinski | 180/65.2 |
| 4,098,144 | 7/1978 | Besel et al. | 180/65.2 |
| 4,148,192 | 4/1979 | Cummings | 60/716 |
| 4,165,795 | 8/1979 | Lynch et al. | 180/65.2 |
| 4,305,254 | 12/1981 | Kawakatsu et al. | 180/65.2 |
| 4,531,605 | 7/1985 | Scholz et al. | 180/65.2 |
| 4,533,011 | 8/1985 | Heidemeyer et al. | 180/65.2 |
| 5,001,412 | 3/1991 | Carter et al. | 310/268 |
| 5,053,632 | 10/1991 | Suzuki et al. | 180/65.2 |

FOREIGN PATENT DOCUMENTS

| | | |
|---|---|---|
| 0 082 932 | 7/1983 | European Pat. Off. . |
| 2 356 304 | 1/1978 | France . |
| 2 943 519 | 5/1981 | Germany . |
| 3 338 548 | 5/1985 | Germany . |

OTHER PUBLICATIONS

Vighetti Motors Leaflet.
R. Miersch et al., Jun. 19, Edition speciale soixantenaire de la S.I.A., with corresponding "VW Golf mit kompaktem Einwellen–Diesel Elektro–Hybrid Antrieb", pp. 112–118 and 1–16.
W. Hamilton, Nov. 1983, Review of Powertrain R & D For Electric Vehicles, pp. vi and vii and 6–10 and 6–11.
Leroy Somer Catalog, Edition 3—1990, pp. B4.4–B4.7.

*Primary Examiner*—Elvin Enad
*Attorney, Agent, or Firm*—Young & Thompson

[57] ABSTRACT

The engine unit for a vehicle comprises a thermal engine (1) and a coaxial relatively flat electric motor (2) which can operate up to, at least, the maximum operating speed of said thermal engine. Said electric motor is constructed and arranged to provide at rest and at low rotational speeds a maximum torque higher than the resisting torque of the thermal engine at rest, and than about one third of the maximum torque of the thermal engine, in order to perform safely the starter function down to the lowest forecast temperature. Said electric motor is constructed and arranged to provide a maximum volumic torque of active parts of at least about 10 Nm/dm³. The controls associated with said electric motor are capable of providing the power corresponding to the maximum torque.

5 Claims, 3 Drawing Sheets

FIG_1

FIG_2

ELECTRIC MOTOR/THERMAL ENGINE DRIVE FOR A VEHICLE IN WHICH THE ELECTRIC MOTOR FUNCTIONS AS A FLYWHEEL, STARTER MOTOR, AND GENERATOR

This application is a continuation-in-part of application Ser. No. 08/651,852, filed on Jan. 30, 1996, which is a continuation of abandoned application Ser. No. 08/252,252, filed on Jun. 1, 1994, which is a file wrapper continuation of abandoned application Ser. No. 07/861,787, filed on Jun. 16, 1992, as the national phase application of International application PCT/FR90/00916, filed on Dec. 17, 1990, which designated the United States.

BACKGROUND OF THE INVENTION

The present invention relates to an engine unit for vehicles.

Most present-day motor vehicles with four or two wheels are propelled by a thermal engine which utilizes the expansion of a fuel/oxidant mixture in order to drive in rotation an output shaft, the movement of which is transmitted to the wheels of the vehicle by means of gear and step-down devices.

The starting of this thermal engine is ensured by an electrical starter fed by a battery. During starting, the battery supplies current to the motor of the starter which, by means of a reducer and a suitable interlock system ("Bendix"), drives the crown of an inertia disc or flywheel fixed to the drive shaft. As soon as the thermal engine is started, the Bendix uncouples the starter motor from the inertia disc, and the drive of the shaft is ensured by the thermal engine alone.

Moreover, the thermal engine drives an alternator by means of a gear device which conventionally comprises pulleys and belts. By means of an electronic regulating device, this alternator supplies an electrical current which makes it possible to recharge the battery.

The sets of electromechanical connections between the battery and the thermal engine which were mentioned above are relatively complex and are an appreciable source of breakdowns.

Furthermore, their use is limited to the above-described functions of starting and of recharging the battery.

U.S. Pat. No. 4,148,192 makes known an engine unit for a vehicle, comprising a thermal engine and an electric motor, such that it can operate without being disconnected mechanically from the thermal engine when the latter rotates at its operating speed.

However, such an engine unit is limited to a thermal engine of low power, itself alone insufficient for ensuring the acceleration of the vehicle. It is only sufficient for maintaining the latter at a reasonable cruising speed.

Advances in electrical engineering and electronics make it possible to rethink the problem completely in order to achieve the greatest possible embodiment simplicity.

The articles "VW GOLF with a compact single shaft Diesel-Electric hybrid propulsion system", by R. MIERSCH, S. SCHUSTEK and R. WIRTZ (INGENIEURS DE L'AUTOMOBILE, June 1987, pages 112–118) and the corresponding German version "VW GOLF mit kompaktem Einwellen-Diesel Elektro-Hybridantrieb", disclose an engine unit for a vehicle comprising a thermal engine and a coaxial relatively flat electric motor which can operate up to, at least, the maximum operating speed of said thermal engine, and which has a rotor and a stator both having a structure made of magnetic material and at least one of them having electrical windings, the rotor having a diameter substantially similar to the diameter of a flywheel normally associated with said thermal engine and an axial length several times smaller than said diameter but not substantially smaller than the axial length of said flywheel, and being constructed and arranged to have an inertia sufficient to perform the speed stabilizing function of said flywheel and replacing said flywheel, said electric motor being associated with controls providing energy to said electric motor and allowing said electric motor to operate also as a generator.

The Diesel engine, a 1.6 liter Diesel engine, has a joint drive shaft with a 6KW, 3-phase asynchron electric motor.

The Diesel engine has a maximum power of 40 KW and a maximum torque of 100 Nm.

The electric motor has a base speed area of 6–2,800 RPM, a maximum speed of 6,000 RPM, a shaft output of 6 KW, a torque in the base speed of 21 Nm, a weight of 8.5 kg, a stator outside diameter of 0.3 m, a total axial length of 0.068 m, a length of magnetic sheet stack of 0.028 m.

The rotor is a squirrel cage rotor. The electric motor has 6 pairs of poles, and the motor current is controlled to the required amplitude and frequency by a single current transducer.

A clutch is provided between the Diesel engine and the electric motor, and a second clutch is provided between the electric motor and a conventional gearbox.

For starting the Diesel engine, the two clutches are declutched, the electric motor is started and rotated until it attains a starting speed which may vary between 825 RPM and 1300 RPM depending on the temperature of the engine. Then, the clutch between electric motor and Diesel engine is activated and the Diesel engine is cranked to start by the kinetic energy of the electric motor. This process is the same for a gasoline engine having a maximum torque of 123 Nm.

Such a starting procedure is not acceptable for a conventional vehicle.

Thus, the object of the present invention is to provide an original association of a thermal engine and of an electric motor, in order to simplify these electromechanical devices, whilst at the same time making it possible for them to perform additional functions.

SUMMARY OF THE INVENTION

According to the present invention, the engine unit for a vehicle is an engine unit of the above-mentioned type wherein:

a) said electric motor is constructed and arranged to provide at rest and at low rotational speeds a maximum torque greater than the resisting torque of the thermal engine at rest, and greater than about one third of the maximum torque of the thermal engine, in order to perform safely the starter function down to the lowest forecast temperature;

b) said electric motor is constructed and arranged to provide a maximum volumic torque of active parts of at least about 10 Nm/dm$^3$;

c) the controls associated with said electric motor are capable of providing the power corresponding to the maximum torque.

According to an interesting embodiment, the maximum torque of the electric motor is higher than about two thirds of the maximum torque of the thermal engine, and the maximum volumic torque of active parts is at least about 20 Nm/dm$^3$.

According to another embodiment, the electric motor maximum torque is substantially equal to the maximum torque of the thermal engine, and the maximum volumic torque of active parts is of about 30 Nm/dm$^3$.

The rotor of the electric motor is dimensioned in such a way that it has an inertia sufficient to allow a steady operation of the thermal engine, so that it can replace the inertia flywheel of the thermal engine.

By the resisting torque of the engine is meant the torque necessary for overcoming the friction of the engine and the compression generated in the cylinders.

Such an electric motor can thus serve as a starter for starting the thermal engine. However, contrary to conventional starters, this electric motor can be coupled permanently to the thermal engine and rotate at the same time as the latter.

Since the electric motor has a torque higher than the resisting torque of the thermal engine, it can be capable of driving both a broken-down thermal engine and the vehicle itself over reduced distances. However, if an uncoupling device (clutch or simple "claw coupling") has been provided between the motor and the engine, the electric motor, since it is no longer braked by the thermal engine not being fed, can drive the vehicle under good conditions, being capable of performing the same service as a purely electric vehicle if the electric motor, the controls thereof and the batteries are of sufficient size and power. Speeds at least equal to the speeds permitted in towns and independence over a plurality of tens of kilometers can easily be afforded, this making it possible to pass through towns without any noise and without pollution.

But this electric motor can also perform functions other than that of a starter.

Thus, the electric motor can operate as a generator when it is driven in rotation by the thermal engine, in order to recharge one or more batteries.

This electric motor can thus replace both the starter and the alternator associated with the thermal engine.

The invention moreover affords a plurality of opportunities. In particular, the circulation of the current towards the battery can be reversed, and the electric motor can then supply a high torque which is added to that of the thermal engine, since the circuits are rated for the starting current. As an example, the boosting torque can, at zero speed, be of an order of magnitude comparable to that of the maximum torque of the thermal engine, whilst at low speeds the thermal engine has a low torque: the boost can therefore be proportionally high.

The electric motor will thus be a genuine starting "booster" for motoring in towns, for steep climbs, for cross-country vehicles, etc. Even if this torque decreases with the speed, it will nevertheless still be very useful for improving the "pick-ups" of the vehicle from a somewhat low speed.

According to a preferred version of the invention, the power of the electric motor is sufficient for driving the vehicle at least at a reduced speed. This electric motor can drive the vehicle independently of the thermal engine, for example in the event of a breakdown of the latter, or in association with the engine. However, it will have the handicap of needing to rotate the thermal engine which constitutes a brake.

In contrast, if an uncoupling device is provided between the output shaft of the thermal engine and the electric motor, the abovementioned handicap is removed.

The drive of the vehicle is thus obtained by means of the electric motor alone, for example in towns, without any noise and without pollution.

The electric motor can also be controlled so as to operate as a retarder of the vehicle and as an energy recuperator during the braking of the latter, for the purpose of recharging the battery or batteries.

Thus, in descents, the electric motor makes it possible to relieve the conventional friction brakes of the vehicle, whilst at the same time recuperating electrical energy.

This system can be completed by its symmetrically equivalent: braking or slowing (for example, in descent), with an additional recharge of the battery. Of course, the battery would have to be rated for the functioning thereby provided. A second battery having a voltage which can be different can be used. For heavy-goods vehicles, therefore, a retarder would be available and would provide energy for recharging the battery, instead of heating up sharply in descents. Uphill, a torque boost would be available.

According to one of the versions of the invention, the electric motor is connected axially to the output shaft of the thermal engine.

The electric motor thus rotates at the same speed as the thermal engine.

In this case, the electric motor is simply interposed between the thermal engine and the transmission members of the vehicle. When this electric motor simultaneously performs the functions of a starter, inertia flywheel, alternator and additional or independent propulsion device, an engine unit both compact and of inexpensive construction and affording substantial advantages in comparison with conventional designs is obtained.

According to another version of the invention, the electric motor is offset relative to the output shaft of the thermal engine, the connection between the motor and the engine being made by means of a speed reducer.

In this case, the electric motor can rotate at a speed different from that of the thermal engine, whilst performing all or only some of the functions mentioned above.

The electric motor preferably utilizes the principle of saturated variable reluctance. Such motors are relatively flat and therefore have a small axial bulk.

Such a flat motor can thus replace the inertia flywheel of the thermal engine, without bringing about a substantial increase in the axial bulk of the thermal engine, whilst at the same time ensuring the additional functions described above.

According to another preferred embodiment of the present invention, the electric motor is a direct current motor with at least one separate excitation winding. It has a ratio of diameter to axial length of about 3 or more, excluding the commutator axial length. The armature is fed from the battery either directly or through a DC to DC chopper. In the electric motor are present at least half of the following features:

- the number of conductors per armature slot is a small even number and preferably 2.
- the product of the number of conductors per armature slot by the number of armature slots is between 120 and 200.
- the circumferential width of the armature slots is practically constant and does not substantially exceed the range of 20 to 30% of the distance measured at the air gap between the centers of two successive armature slots.
- the radial length to maximum width ratio of the slots is in excess of 10.
- the armature wires are flat rectangles with a width equal to half the length of the slots less mechanical and electrical tolerances.

the height of the stator teeth is between 5 and 10% of the diameter of the motor.

the stator magnetic circuit has teeth corner recesses which permit to insert polar horns, for widening the flux path in the air gap, after mounting the excitation windings.

the flux outer peripheral path is between about 35% and 45% of the pole width.

the number of poles is at least 16.

the effectively active parts of the motor are in the form of a crown of which the radial thickness is not substantially greater than half its maximum radius.

A method for designing a high peak torque electric motor for an engine unit according to the present invention consists in creating a computer program of design by objective as a function of the maximum dissipation in watts per kilogram, in defining such maximum dissipation as a function of the expected duration of the peak torque expected, in taking appropriate measures to minimize the differences of temperature between the hottest spots and the average temperature and in optimizing successively all parameters towards a primary target such as the reduction of thickness and secondary targets such as the mass or the facility of manufacture.

The various parameters may be improved by incorporating at least some of the above-mentioned features.

All these versions make it possible to eliminate the starter, Bendix, inertia disc and its toothing for the action of the starter, alternator and corresponding pulleys and belts. Moreover, the commutator and contactor of the starter which handle high currents are replaced by very reliable power electronics and low-current control circuits which present no problem.

Other particular features and advantages of the invention will also emerge form the following description.

BRIEF DESCRIPTION OF THE DRAWINGS

In the accompanying drawings given in a non-limiting way.

DESCRIPTION OF THE PREFERRED EMBODIMENTS

Figure 1:
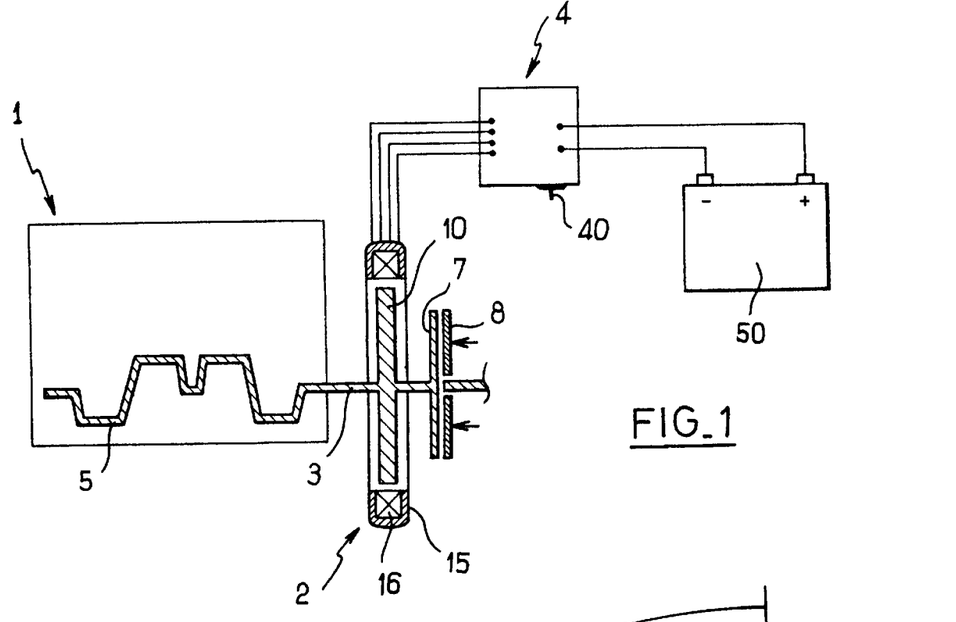
FIG. 1 illustrates diagrammatically an engine unit according to the invention.

FIG. 1 shows diagrammatically an engine unit according to the invention. A thermal engine 1 acts on a crankshaft 5 in order to drive an output shaft 3 in rotation. The end of the shaft 3 is connected to a clutch disc 7 fixed to the shaft 3. A second clutch disc 8, connected to transmission devices not shown, can engage on the first disc 7 or disengage from it in order to perform the conventional functions of a clutch engagement/release of the transmission devices.

Between the output of the thermal engine 1 and the clutch disc 7, an electric motor 2 is mounted directly on the shaft 3. By "directly" is meant that the rotor 10 of the electric motor 2 is fixed to the shaft 3. More specifically, this rotor 10 has the general form of a disc perpendicular to the shaft 3 and centered on the latter. In addition to the rotor 10, the electric motor 2 comprises a stator 15 which has windings 16. The stator 15 has the form of a crown which extends around the rotor 10.

As well known in the art of electric motors, both the rotor and the stator have a structure made of magnetic material. As an alternate, the electrical windings could be arranged on the rotor alone, or both the rotor and the stator could have electrical windings.

The windings 16 of the stator 15 are fed by means of electronic circuits included in control means 4. These control means 4 are also connected to the battery 50, and they can be manipulated by the user by means of a button 40 or any other means.

The control means 4 and the corresponding electronic circuits are provided for causing the motor 2 to operate in different modes:

in the starter mode; a current circulates in the windings 16 for driving the rotor 10. This rotor 10 exerts a sufficient torque to start the thermal engine 1;

in the boost mode; with the thermal engine 1 driving the shaft 3, a current is transmitted to the stator 15 in order to supply a torque on the shaft 3 in the same direction as the torque of the thermal engine 1;

in the alternator mode: the thermal engine 1 drives the shaft 3 and a fraction of the mechanical rotational energy of the rotor 10 is converted by the electric motor 2 into current which is established in the windings 16; a load controller incorporated in the control means 4 then makes it possible to recharge the battery 50;

in the slowing/braking mode; with the thermal engine 1 in operation, a current is transmitted to the windings 16 of the stator 15, so that the electric motor 2 supplies an opposing torque which brakes the rotation of the shaft 3.

These controls consist for instance, in a known way, of a fixed frequency variable phase AC to AC chopper.

The set-up illustrated in FIG. 1 can thus perform the functions conventionally executed by the inertia disc, the starter, the alternator and all the associated electrical circuits and mechanical gear devices. It can, in addition, supply an additional torque to the thermal engine 1, this being particularly desirable at low speed. It can also contribute to the braking of the vehicle, without giving rise to excessive heating, because the mechanical energy converted during this braking can be converted in electrical form and serve for recharging the battery. For this latter use, it can prove expedient to modify the battery 50 in relation to conventional batteries or to provide a second battery. For all other uses, a traditional battery makes it possible to employ the electric motor 2 in all the functions mentioned.

Figure 2:
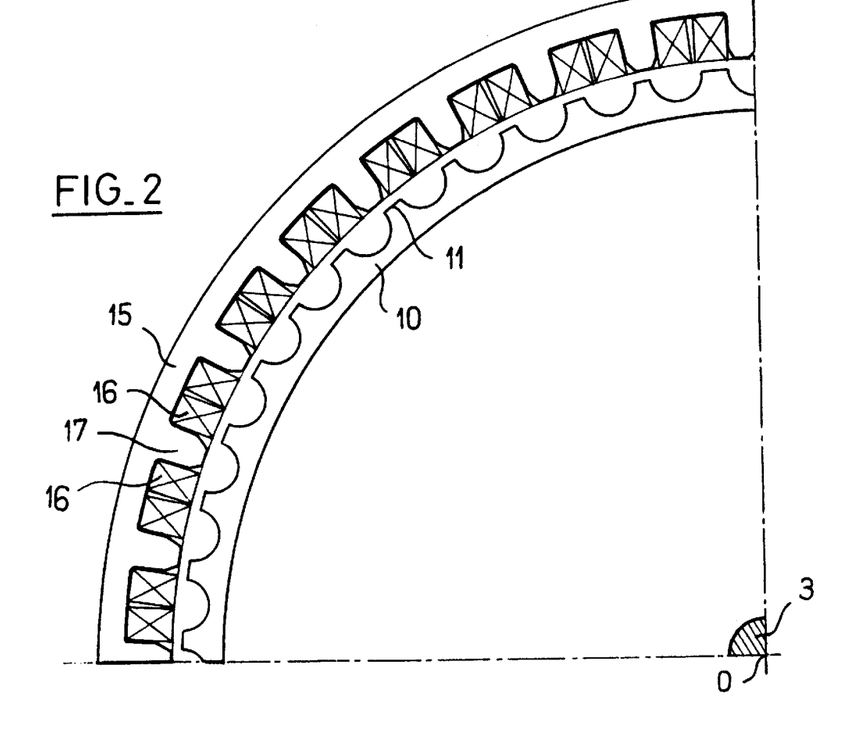
FIG. 2 is a partial plan view of an electric motor which can be used for putting the invention into practice.

To put the invention into practice, an especially suitable electric motor is a motor with saturated variable reluctance. These motors are described in detail in French Patents 1,445,572, 2,109,144 and 2,356,304. FIG. 2 shows an example in which the rotor 10 has the form of a disc and in which the stator 15 constitutes a crown on the periphery of the rotor 10. A quarter of the stator 15 and of the rotor 10 can be seen in this Figure. The assembly as a whole is centered at the point 0 which is also located in the center of the shaft 3 fixed to the rotor 10.

The periphery of the rotor 10 has teeth 11 spaced uniformly and formed from a magnetic material. The stator 15 made of magnetic material possesses opposite the rotor 10 a series of studs 17 spaced uniformly. Each stud 17 is surrounded by a coil 16. The rotor 10 is driven in rotation as a result of the effect of the magnetic fluxes which are generated in the studs 17 by the current circulating in the coils 16 and which pass through the teeth 11 of the rotor 10. Current is fed to the coils 16 by means of electronic control circuits which, in the example of FIG. 1, are included in the control means 4.

These electric motors with saturated variable reluctance can deliver a high nominal torque for a reduced bulk. A characteristic which makes them especially suitable for use in an engine unit according to the invention is that they have a torque higher at low speed. Thus, the torque at zero speed can be more than twice as high as the nominal torque. This gives them maximum efficiency during starting and during "pick-ups" at low speed.

Furthermore, these motors are relatively flat and have a ratio of diameter to thickness which is equal to or higher than 4 and often 6.

On the other hand, this type of motor presents no problem of tolerance in terms of mechanical play. In fact, the rotor/stator air gap corresponds to a difference in radius of a plurality of tenths of a millimeter, whilst the play of the crankshaft 5 is typically of the order of a few hundredths of a millimeter.

Advantageously, the coils 16 of the stator 15 can be grouped in a plurality of groups fed independently by independent control circuits.

In this way, the failure of a control circuit does not result in a complete breakdown of the electric motor 2 because it does not affect the circuits corresponding to the other groups.

As an example, for a vehicle of small cubic capacity (maximum torque of 150 Nm), the inertia disc of which has a diameter of 280 mm for a thickness of 22 mm and the "pull-out" torque is likewise to reach 150 Nm, the embodiment can be thus:

rotor diameter; 280 mm, like the inertia disc;

thickness or axial length of the magnetic circuit 40 mm;

starting torque: 150 Nm, even when the battery is at the lowest temperatures required (for example, −40° C.);

outside diameter: 350 mm;

variation in the output voltage virtually down to zero by controlled self-excitation;

number of stator coils: 36;

for reasons of safety in use, the coils are grouped in 3 groups of 12 fed separately. Thus, a cut-out of one of the circuits makes it possible to obtain 100 Nm with the other 2 and allows starting outside extreme cases; each group forms an independent sub-motor which is capable to be operated alone and to provide a maximum torque of 50 Nm;

feed of each group of coils by 4 transistors or thyristors and 4 diodes;

number of teeth of the rotor 51;

control circuits making it possible to use the same semiconductors during functioning as an alternator;

the rotor can be solid or hollow at its center (maximum diameter of this hollow 240 mm) in order to be fitted onto a standard steel cylinder.

In a variable saturated reluctance Motor, where the saturation of the poles of the stator is required, the circumferential width of the recess between two adjacent poles is substantially longer than 50% of the pole pitch in order to maximize the ampere-turns for saturating said poles. Said recess may be equal to 60% of the pole pitch, as substantially represented on FIG. 2.

In the above-mentioned example wherein the stator internal diameter is 280 mm and the number of poles is 36, the following figures are obtained:

Stator internal circumference: 280×3.14=880 mm

Pole pitch 880: 36=24.4 mm

50% of pole pitch: 12.2 mm

60% of pole pitch: 14.64 mm

The width of each stator coil is approximately 50% of the recess width, i.e. 6.1 mm for a recess width of 50% of the pole pitch, and 7.32 mm in the case of 60% of the pole pitch.

As the electric motor replaces the flywheel normally associated with the thermal engine, has substantially the diameter of said flywheel, and a axial length not much longer than that of said flywheel, it is important to consider the thickness or axial length of the active parts of said motor, which consist in the electromagnetic parts to which must be added the thickness or axial length of the overhang parts of the stator coils on both sides of the magnetic stack. The active parts thickness or axial length corresponds accordingly to that of the magnetic stack plus twice the width of the stator coils.

The active parts thickness or axial length is accordingly, for the above mentioned example:

for 50% of the pole pitch: 40+6.1+6.1=52.2 mm for 60% of the pole pitch: 40+7.32+7.32=54.6 mm The maximum volumic torque for active parts of this motor is taken as the maximum torque for the volume of a cylinder having the diameter of the motor and the axial length or thickness of said active parts.

Such an electric motor has a total axial length of about 100 mm, and a weight of about 12 kg.

The electric motor and each one of the above-mentioned sub-motors have the same apparent volume of active parts for 50% of the pole pitch:

$$3.5 \times 3.5 \times 3.14 \times 0.25 \times 0.522 = 5.02 \# 5 \text{ dm}^3$$

and the same total apparent volume $$3.5 \times 3.5 \times 3.14 \times 0.25 \times 1 = 9.62 \text{ dm}^3$$

This gives the following ratios of maximum volumic torque

|  | electric motor | sub-motor |
| --- | --- | --- |
| maximum torque | 150 Nm | 50 Nm |
| volume of active parts | 5.0 dm$^3$ | 5.0 dm$^3$ |
| total volume | 9.62 dm$^3$ | 9.62 dm$^3$ |
| maximum volumic torque | 15.6 Nm/dm$^3$ | 5.2 Nm/dm$^3$ |
| maximum volumic torque of active partS | 30 Nm/dm$^3$ | 10 Nm/dm$^3$ |

When two groups are operated to provide a maximum torque of 100 Nm, they provide a corresponding maximum volumic torque of 10.4 Nm/dm$^3$ and a maximum volumic torque of active parts of 20 Nm/dm$^3$.

In the case of a recess width equal to 60% of the pole pitch, the volume of active parts would be $$3.5 \times 3.5 \times 3.14 \times 0.25 \times 0.546 = 5.25 \text{ dm}^3$$

and the maximum volumic torque would be for the motor 150: 5.25=28.6 Nm/dm$^3$ for each sub-motor 50: 5.25=9.52 Nm/dm$^3$ The figures of 30 and 10 Nm/dm³ are accordingly quite representative of the characteristics of maximum volumic torque of this motor.

Without going into detail, in many vehicles the clutch or torque converter is contiguous with the inertia disc. The presence of an electrically active component in place of this disc makes it possible to rethink some clutch-control problems, whilst having the capacity to supply current to the subassembly rotating with the engine.

Thus, as a result of the present invention, electrical loops intended for the circulation of a current induced by the magnetic field generated by the coils 16 of the stator 15 can be arranged on the rotor 10. It is thereby possible to obtain on the rotating part active electrical circuits which can be employed particularly for executing an electromagnetic coupling between the clutch discs 7 and 8. This results in a considerable simplification of the clutch mechanisms which are traditionally complex and of limited reliability.

In another version of the invention, the electric motor 2 is designed to supply an instantaneous measurement of the rotational speed or of the angular position of the rotor 10 and consequently of the shaft 3 and crankshaft 5.

The detection of the rotational speed of the shaft can be utilized to provide the driver with reliable information on the revolution counter and the odometer. The detection of the angular position can be used in an expedient way to synchronize actions on the thermal engine 1, such as the intake of the fuel/oxidant mixture, the exhaust of the gases produced by combustion or the spark where a spark-ignition engine is concerned. Such a synchronization can be obtained by means of simple electronic circuits.

Figure 3:
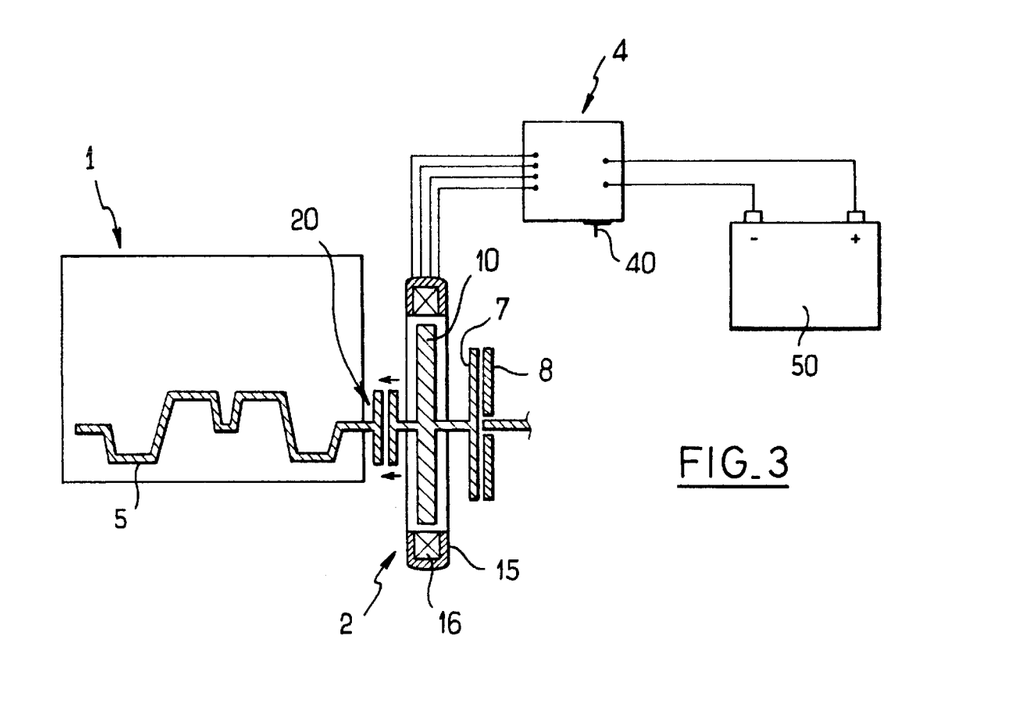
FIG. 3 illustrates diagrammatically a first alternative embodiment of an engine unit.

In the embodiment of FIG. 3, the engine unit comprises furthermore, an uncoupling device 20, such as a clutch, between the thermal engine 1 and the rotor 10 of the electric motor 2.

This device makes it possible, when uncoupled, to cause the vehicle to operate with the electric motor 2 only. The vehicle can thus travel in towns without any noise or pollution and with an independence which depends on the battery.

Figures 4, 5:
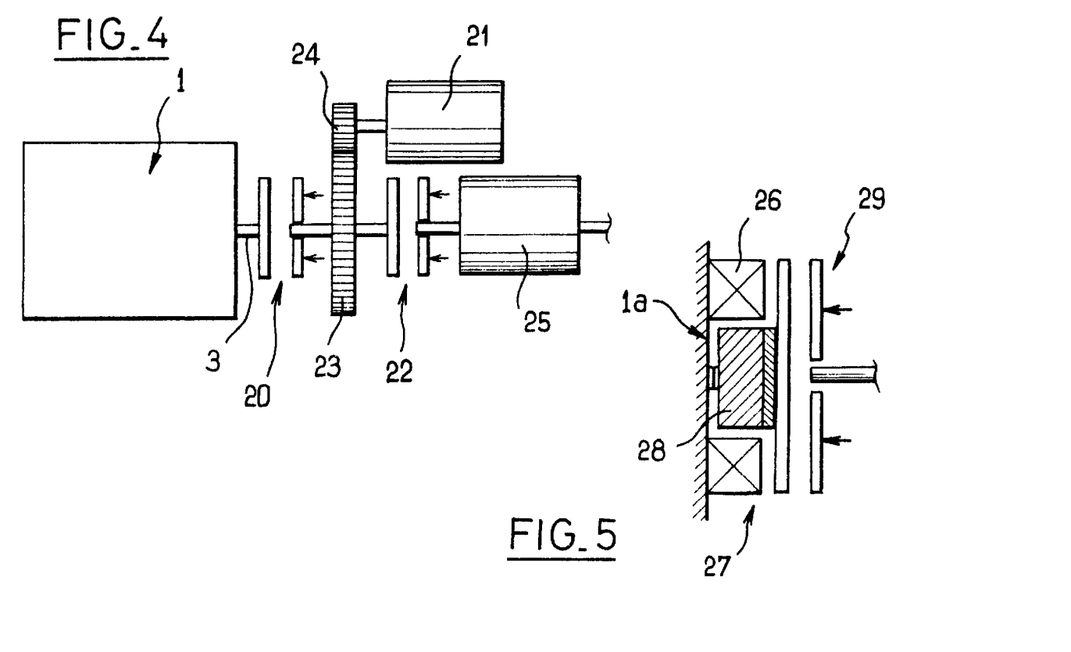
FIG. 4 illustrates diagrammatically a second alternative embodiment.
FIG. 5 is a partial view similar to FIG. 3 illustrating diagrammatically another alternative embodiment of an engine unit according to the present invention.

In the embodiment of FIG. 4, the electric motor 21 is not connected axially to the thermal engine 1, but is offset relative to the latter. The connection between the output shaft 3 of the thermal engine 1 is made by two gear pinions 23, 24 establishing a particular step-down ratio. Downline of the pinion 23 are located the clutch 22 and the gearbox 25 or variable-speed drive which normally equip a vehicle with purely thermal propulsion.

Moreover, between the output shaft 3 of the thermal engine 1 and the pinions 23, 24 connecting this shaft to the electric motor 21, there is a second clutch 20 which makes it possible to uncouple the thermal engine 1, in such a way that the vehicle is propelled solely by the electric motor 21. In this case, the vehicle has reduced independence, but can travel in towns, without generating pollution.

When the electric motor 21 is coupled to the thermal engine 1, it performs the following functions, as described before:

- the starting of the thermal engine in the same way as the starter of a normal thermal engine vehicle,
- the recharging of the battery, as with a dynamo or alternator,
- additional propulsion, especially at low rotational speeds of the thermal engine, because the electric motor has, at low speeds, a torque higher than that of the thermal engine,
- the slowing and braking of the vehicle, causing the motor to function as an electrical current generator which recharges the battery.

To perform the starting function means that the electric motor must provide a starting torque higher that the resisting torque of the thermal engine, even at the lowest temperatures required, but must provide said starting torque during the period of time necessary for starting the thermal engine. This period of time is of an order of magnitude of a few minutes on a conventional vehicle with a conventional starter.

Accordingly, the electric motor must be capable to provide said starting torque during said period of time and to support the corresponding heat dissipated during said period of time. It is known that an electric motor is capable to support 100% or 200% overload condition during a few minutes.

On the contrary, the controls are not adapted to support overloads and must be dimensioned so as to be capable to provide the corresponding energy on a steady basis.

All these functions can be controlled either according to the driver's wish or automatically.

In the exemplary embodiment of FIG. 5, the stator 26 of the electric motor 27 is fastened directly to the rear face 1a of the thermal engine, whilst the rotor 28, which replaces the inertia flywheel of the thermal engine, is mounted axially and directly on one of the plates of the clutch 29. This arrangement allows the engine unit to be made more compact and an appreciable saving to be achieved.

The above disclosed VSR (Variable Saturated Reluctance) AC motor was the first one capable to accomplish, within the space available, the three auxiliary functions: thermal engine starter, generator and flywheel of a vehicle, as detailed and quantified below.

The Torque

The resisting torque of a thermal engine increases at low temperatures (for instance −30 or −4020 C.) at a rate unexpected by non-specialists. As an example within the power range considered of "small cubic capacity" the resisting torque, measured directly on the engine shaft inside a cold room, of a given 50 kW 1,300 cm³ gasoline engine, having a 110 Nm maximum torque, ranges from around 20 Nm under favorable conditions, to 60 Nm at −18° C., 80 Nm at −25° C., 100 Nm at −30° C. A Diesel engine of the same power (1,900 cm³) reaches 135 Nm at −25° C. and 180 Nm at −30° C. This shows that the maximum resisting torque of a thermal engine, at low temperature, is at least, a substantial fraction of its own maximum torque. The VSR motor disclosed does provide a 150 Nm torque to start a thermal engine having a 150 Nm maximum torque. It is made of three sub-motors fed separately which can work independently providing each one third of 150 Nm, i.e. 50 Nm. Even if a 20 Nm electric motor may episodically start the considered thermal engine, it will not accomplish the function of a starter, which is a technical and even a safety function, to be always performed (without stalling nor burning out ) even in the coldest weather and requires a peak torque several times greater. Thus the electric motor must be capable of producing at rest and at low rotational speeds, a torque higher than the resisting torque at rest of the thermal engine in order to perform the starter function down to the lowest forecast temperature and at least equal to one third of the maximum torque of the thermal engine.

The Diameter

The usual flywheel, being designed to obtain a high inertia in a small space, has the greatest diameter compatible with the diameter limit imposed by the thermal engine manufacturer. Any electric motor located next to the thermal engine must respect this limit and the rotor must have a diameter not greatly in excess of the diameter of the flywheel it replaces. The diameter of the motor is somewhat greater than the rotor, but it is acceptable since the flywheel must be protected by a hood for safety reasons whereas the motor does not need this protection. The disclosed VSR motor has a rotor diameter of 280 mm and a complete motor diameter of 350 mm both substantially similar to the diameter of 280 mm of the replaced flywheel (±25%). MIERSCH discloses substantially these dimensions.

The Length

It should not substantially increase the thermal engine length in order to have "an engine unit both compact and of inexpensive construction", providing a "high nominal torque for a reduced bulk", and, naturally, not upset the vehicle structure, while being sufficient to provide the necessary inertia. General purpose motors available on the market, have a length substantially greater than their diameter and their length is not acceptable. Only motors substantially shorter than a motor with a "square" rotor (diameter equal to length of the active parts, excluding the protrusion of the commutator in the case of DC motors), i.e. "relatively flat motors" are satisfactory. Replacing the disclosed 22 mm thick flywheel and its protective hood by a motor more than 100 mm thick would be objectionable. The VSR motor disclosed has a magnetic circuit 40 mm thick and, according to the type of structure used (for instance steel or aluminum flanges), the thickness of the motor reaches 80 to 100 mm, about one fourth of the 350 mm diameter. However in order to achieve a sufficient mechanical and thermal inertia the motor cannot be extra-flat. Only the motors having a thickness not substantially below that of the flywheel to be replaced are considered in the field of the invention.

The Controls

An AC motor working at a variable frequency requires an electronic power control much more expensive than the motor itself. The VSR has the advantage of requiring a fixed frequency electronic power control at about half of such cost. A DC motor requires either a power electronic armature control only which has a cost reputed to be three times smaller or only a still cheaper electronic field control if the armature is connected directly to the battery. This is one of the reasons why DC motors are of great interest for automotive applications. The controls must be sized so as to be capable to provide the energy corresponding to the required maximum power and torque.

The Massic and Volumic Maximum Torque

Even though DC motors available on the general market do not have the proportions required, their ability to produce torque for a given size can be made comparable by reference to their massic or volumic maximum torque.

Table 1 below compares the main data on the VSR disclosed.

two DC motors from the 1990 catalog of Leroy Somer, a leading European manufacturer, representative of the state of the art at the time of filing the present application. Copies of the relevant pages of this catalog are enclosed by way of reference. The MS 1001L DC motor has a volume comparable to the VSR motor but a higher mass since it is not hollow in the center. The MS1321 M is far from acceptable in size and is given for information as an extreme case: its mass of 89 kgs is almost twice the mass of the thermal engine itself of about 50 kgs and four times the total mass of about 25 kgs of the starter, generator and flywheel saved.

In all three examples the maximum torque is taken at 3 times the nominal torque which is usually considered as a maximum overload. The maximum volumic torque for active parts is taken as the maximum torque for the volume of a cylinder having the diameter of the motor and the axial length of the magnetic circuit, said magnetic circuit consisting of magnetic sheet stack with the corresponding windings, including the overhang parts of the coils, for the stator and/or the rotor. The total maximum volumic torque refers to the volume of the complete motor, which in the case of the VSR motor is about the double. If the motor has a square section, it is replaced by the inscribed circle in order to be homogeneous.

TABLE 1

|  | VSR Motor | MS 1001 L | MS 1321 M |  |
| --- | --- | --- | --- | --- |
| mass of active parts | 6 |  |  | kg |
| axial length of magnetic stack | 40 |  |  | mm |
| axial length of active parts | 52 |  |  | mm |
| thickness of motor | 100 |  |  | mm |
| mass of motor | 12 | 36 | 89 | kg |
| inertia of the rotor | 1 |  |  | $Nm^2$ |
| nominal torque | 50 | 6 | 25.4 | Nm |
| corresponding ohmic losses | 200 | 400 | 480 | W |
| maximum torque | 150 | 18 | 76 | Nm |
| maximum armature losses | 1800 | 3600 | 3000 | W |
| outside diameter | 350 | 200 | 260 | mm |
| total length (w.o. commutator) | 100 | 310 | 443 | mm |
| diameter/thickness ratio | 3.5 | 0.77 | 0.59 | $dm^3$ |
| total volume occupied | 9.6 | 9.7 | 23.5 | $dm^3$ |
| volume of active parts | 5.0 |  |  | $dm^3$ |
| max. volumic torque - Active parts | 30 |  |  | $Nm/dm^3$ |
| max. volumic torque - Total | 15.6 | 1.9 | 3.2 | $Nm/dm^3$ |
| max. massic torque - Total | 12.5 | 0.5 | 0.85 | Nm/kg |

The MS 1001 L motor provides a maximum torque of only 12% of that of the VSR , its volumic torque is about ⅛th and its massic torque ½5$^{th}$. This shows the unexpectedly great increase in performance achieved by the VSR which made possible the disclosed solution.

The MS 1321 M motor occupies almost 3 times the allowed space and provides only half the torque needed. In accordance with the theory, its larger size provides a volumic and massic torque improved approximately as the square root of the ratio of the masses.

This explains why DC motors were considered improper for providing a sufficient torque in the allowed volume and why Heidemeyer, (U.S. Pat. No. 4,533,011), who mentions DC motors, invented his solution to compensate for such a lack of torque.

The VSR motor thus provided for the first time the desired torque in the allowed volume. However it was unusable for providing the starting function, but unusable for the present invention because not being "such that it can operate without being disconnected mechanically from the thermal engine when the latter rotates at its operating speed" . Indeed the 1983 Hamilton Report (No. CR-1-1193/1, "Review of Power-train R&D For Electric Vehicles", by WILLIAM HAMILTON CONSULTANT, November 1983, prepared for ELECTRIC POWER RESEARCH INSTITUTE, PALO ALTO, Calif. 94303, contract RP 1523-4, GENERAL RESEARCH CORPORATION, pages 6–10 and 6–11), incorporated herein by way of reference, rightly presented it in the USA in its section 6.3.B as "a low-speed wheel motor, mounted within and driving directly without gearing the wheels of the EV". Similarly the French Licensee Vighetti, of which catalog sheets are incorporated by way of reference, has built motors with a torque satisfactory for direct starting (50 Nm and 150 Nm at 200% overload) but limited to 600 rpm. Applicant found that proper changes in its mechanical and electrical construction combined with a change in the control circuits (for instance a higher frequency for the electronic oscillator ), would permit a base speed of 3,000 rpm and a maximum speed around 6,000 rpm permitting to operate at the usual high speeds of thermal engines, and having an adapted mechanical and electrical inertia.

The knowledge of the state of the art and his long experience in the field (he designed and built his first electronic control for DC motors in 1947), enabled the Applicant to conclude that a development effort, using his disclosure as the Ariadne thread, could lead to satisfactory DC motors permitting to use much less expensive controls, and a development program was started, with high torque motors specialists, towards a high peak torque (HPT) motor.

The HPT DC Motor

Motors working at a multiple of their nominal current have ohmic losses climbing like the square of such multiple increasing rapidly the temperature and creating "hot spots" around the slots of the armature. The average temperature rise is function of the watts to be dissipated and the thermal capacity of the motor. The mix of iron and copper of an electric motor has in the extreme cases a maximum thermal capacity of 0.46 watts/° C.: in the absence of cooling the temperature of 1 gram would increase of 1° C. per second for 0.46 watt. Assuming, for instance, the temperature rise should not exceed 200° C. in 5 minutes (usual batteries would not sustain the current involved for longer durations) or 0.67° C. per second, the corresponding power dissipated is 0.67×0.46= 0.3 w/g or 300 w/kg. It is a major part of a good design to reduce as much as possible the excess of the "hot-spots" temperature and average temperature.

A comprehensive "design by objective" computer program was created in order to find the impact of all parameters involved on the characteristics of an HPT DC motor, while respecting a peak dissipation objective set at 250 w/kg (initial temperature rise of 33° C./min) towards optimizing the motor thickness as a primary goal and its mass and ease of manufacturing as secondary goals.

Figure 6:
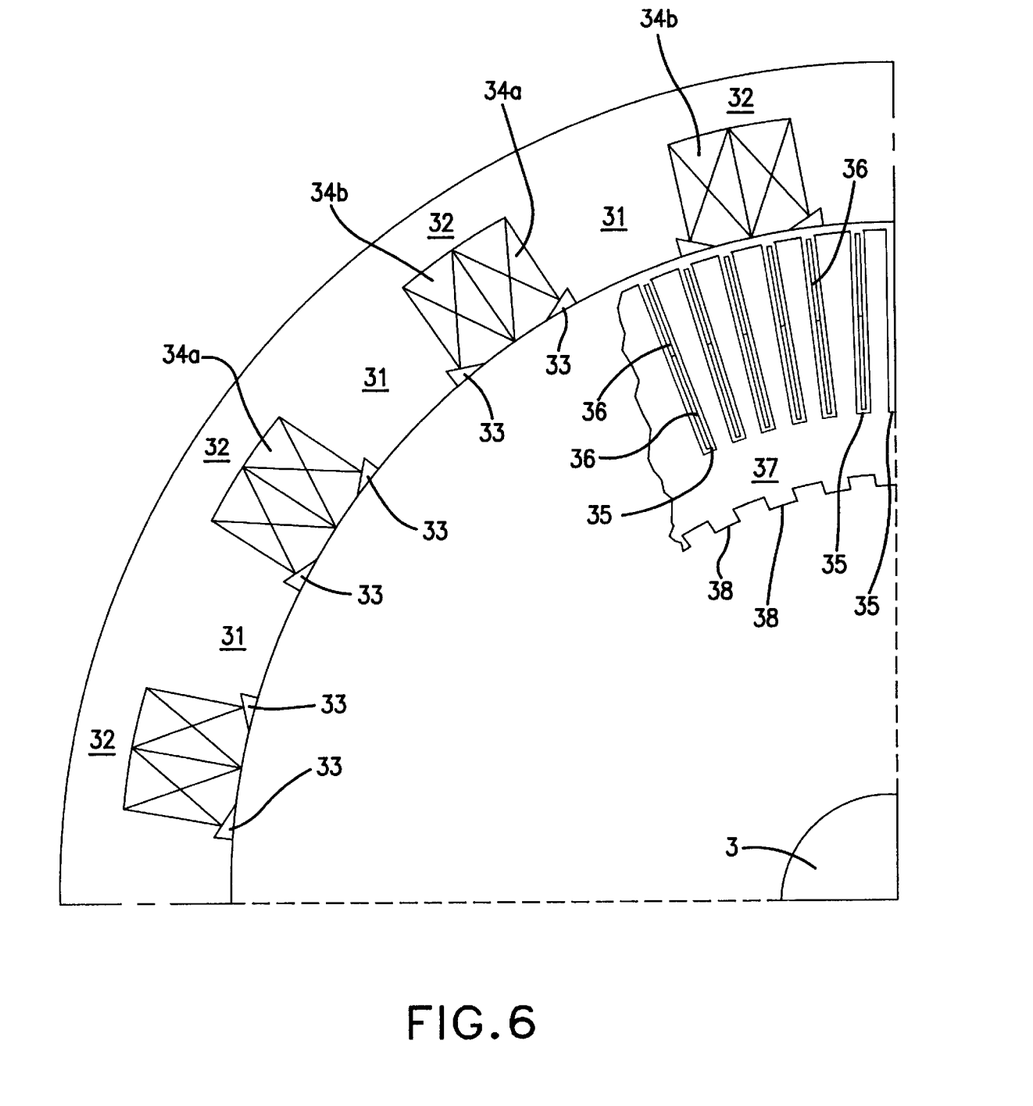
FIG. 6 is a view similar to FIG. 2 of a DC electric motor according to another embodiment of the present invention.

FIG. 6 is a cut-away of one quarter of such an HPT motor having an external diameter of 350 mm, providing 9 kW at 3.000 rpm under 120 volts and having 16 poles. The original points are mainly the following:

- the teaching of the VSR of aiming at a high number of poles was followed and an optimum appeared around 16 poles.
- the crownshape of active parts of the VSR was also followed, with the alternate of filling the inside with metal, used more as a heat sink than an active part.
- the cut-in space between poles 31 has a depth from about 6% to 8% of the diameter of the motor for optimizing the volume available for the field windings.
- the poles 31 have a circumferential length of about 60% of the polar pitch in order to maximize the flux through the machine.
- the width of the outside circular magnetic path 32 between the poles is only about 40% of the length of such poles for increasing the rotor diameter.
- the field winding coils 34a, 34b located around each pole occupy the totality of the available space: the base of the poles has recesses permitting, after the coils have been freely positioned, to insert the polar horns 33 which increase the magnetic area adjacent to the air gap.
- the air gap is chosen at the lower limit compatible with mass production, for instance 0.5 mm for the size considered.
- the armature, which has a diameter of about 280 mm like the flywheel, comprises 80 slots 35, or 5 per pole, corresponding, with the voltage used, to 2 wires 36 per slot which is the optimum number for filling fully and easily the slots with copper and for dispersing the heat sources. Higher voltages would increase the number of wires per slot which should preferably be kept at 4 or 6.
- the slots, contrary to the usual "amphora" shape, have a narrow and long rectangular shape, the ratio of length to width exceeding 10, in order to permit the use of flat wires 36 occupying the maximum volume of the slot, reducing the resistance of the armature winding and extending each heating zone, with an acceptable narrowing of the flux path, as can be seen on the drawing.
- the inner circular magnetic path 37 has a width slightly greater than the outside one and the inner surface has cooling teeth or fins 38.
- the inner diameter of the rotor is set at about half of the diameter of the motor in order to free enough space near the shaft for other uses such as the commutator itself or a clutch if the commutator is external. For this reason all the dimensions given do not include the commutator.

All these dispositions contribute to the increase of the peak value of the torque available in a small flat volume, but a partial use of this teaching may be sufficient to reach the objective.

Table 2 shows the characteristics of four motors corresponding to FIG. 6 all designed to have a peak maximum torque around 123 Nm, which is the maximum torque of Miersch's thermal engine, and respecting the 250 w/kg peak dissipation limit. It is given as an example applying to the first parameter, the number of poles, the method developed.

TABLE 2

| VHT DC Motors | | | | | |
| --- | --- | --- | --- | --- | --- |
| number of poles | 4 | 8 | 16 | 32 | |
| mass of active parts | 36.3 | 25.5 | 19.6 | 14.4 | kg |
| axial length magnetic stack | 54.1 | 42.1 | 41.7 | 50.4 | mm |
| axial length active parts | 142 | 86 | 64 | 61 | |
| thickness motor w.o. commutator | 172 | 116 | 94 | 91 | mm |
| mass of motor | 55 | 38 | 29 | 28 | kg |
| inertia of the rotor | 0.7 | 1.2 | 1.3 | 1.2 | $Nm^2$ |
| nominal armature losses | 462 | 332 | 247 | 214 | W |
| nominal torque | 28.7 | 28.7 | 28.7 | 28.7 | Nm |
| maximum peak torque | 126.1 | 123.1 | 122.4 | 122.3 | Nm |
| maximum armature losses | 8919 | 6108 | 4492 | 3886 | W |
| diameter/thickness ratio active parts | 6.5 | 8.3 | 8.4 | 6.9 | |
| motor (w.o. commutator ) | 3.2 | 4.2 | 4.2 | 3.5 | |
| volume of active parts | 13.6 | 8.3 | 6.1 | 5.9 | $dm^3$ |
| total volume occupied | 16.5 | 11.1 | 9 | 8.7 | $dm^3$ |
| max. volumic torque - Active parts | 9.3 | 14.8 | 20. | 20.7 | $Nm/dm^3$ |
| max. volumic torque - Total | 7.6 | 11.1 | 13.5 | 1 | $Nm/dm^3$ |
| max. massic torque - Total | 2.3 | 3.2 | 4.2 | 4.4 | m/kg |

The axial length, which is the primary objective, is unacceptable for the 4-pole motor, but reasonable for the 8-pole motor, and satisfactory for 16 and 32 poles. The secondary objective of reducing the mass eliminates the 8-pole motor. The secondary objective of manufacturing simplicity eliminates the 32-pole motor, since the axial length advantage is negligible. The choice is clearly in the vicinity of 16 poles.

After this first choice all the other parameters are defined by the same method. When it is done the computation is done again in order to define the number of poles with more precision. Then all the parameters are reviewed and so on. The final HPT motor so defined meets the imposed dimensional limits and provides the necessary torque in conformity with our teaching and claims. Its mass is higher than the mass of the VSR but remains acceptable (it saves about 25 kgs of auxiliary equipment ) and provides a great saving in the cost of the controls.

These calculations clearly demonstrate the significant value of the ratio of maximum volumic torque for active parts of 10 Nm/dm$^3$ calculated hereabove. They also clearly demonstrate that this ratio is sufficient in itself to allow one skilled in the art of electric motor calculation, to design an electric motor adapted to be associated to a thermal engine for realizing an engine unit according to the present invention.

Of course, the invention is not limited to the exemplary embodiments just described, and many modifications can be made to this, without departing from the scope of the invention.

Thus, the rotor of the electric motor could comprise a transducer making it possible to transmit an electrical signal which is dependent on the rotation of the rotor and the power of which is sufficient to execute a control function, such as the operation of an uncoupling device.

On the other hand, the electric motor could be designed to be capable of driving a wheel set different from that of the thermal engine, thus allowing operation with four driving wheels on difficult ground.

I claim:

1. In a vehicle engine unit that includes a thermal engine having a maximum torque and a starting resisting torque at a lowest ambient temperature for operating the thermal engine, and an electric motor mounted coaxially with the thermal engine, the electric motor having a nominal torque, a maximum torque at zero and low speed, and a maximum torque per unit volume, where the volume is defined by a cylinder having a diameter and an axial length of active parts of the electric motor, the active parts being a stator, a rotor, and stator coils, the electric motor being arranged and constructed to provide inertia to the thermal engine during operation of the thermal engine, to start the thermal engine, and to provide electricity when the electric motor is being driven by the thermal engine, and the stator and the rotor are both substantially flat, where a ratio of a total axial length of the electric motor to a diameter of the electric motor does not exceed one-third:

the improvement in which the electric motor has a total axial length of no more than 100 mm and a diameter of no more than 350 mm, the electric motor is arranged and constructed to provide the maximum torque at zero and low speed that is more than twice the nominal torque of the electric motor and more than the starting resistive torque of the thermal engine at the lowest ambient temperature for operating the thermal engine, and in which the maximum torque per unit volume of the electric motor is at least 10 Nm per cubic decimeter at zero and low speed.

2. The engine unit of claim 1, wherein the electric motor comprises coils that are separated into plural groups, each of the groups having a separate power supply so as to define a sub-motor, each of the sub-motors being independently operable and providing a maximum torque of at least 50 Nm.

3. The engine unit of claim 1, wherein the electric motor is arranged and constructed to provide the maximum torque at zero and low speed that is more than one-third of a maximum torque of the thermal engine.

4. The engine unit of claim 1, wherein the electric motor is arranged and constructed to provide the maximum torque at zero and low speed that is more than two-thirds of the maximum torque of the thermal engine, and wherein the maximum torque per unit volume of the electric motor is at least 20 Nm per cubic decimeter at zero and low speed.

5. The engine unit of claim 4, wherein the electric motor is arranged and constructed to provide the maximum torque at zero and low speed that is substantially equal to the maximum torque of the thermal engine, and wherein the maximum torque per unit volume of the electric motor is at least 30 Nm per cubic decimeter at zero and low speed.

* * * * *